(12) United States Patent
Inoue

(10) Patent No.: US 9,491,382 B2
(45) Date of Patent: Nov. 8, 2016

(54) CLAMPING METHOD

(71) Applicant: Panasonic Corporation, Osaka (JP)

(72) Inventor: Tadayuki Inoue, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 162 days.

(21) Appl. No.: 14/058,620

(22) Filed: Oct. 21, 2013

(65) Prior Publication Data

US 2014/0354862 A1    Dec. 4, 2014

(30) Foreign Application Priority Data

May 30, 2013  (JP) ................... 2013-113714
Sep. 13, 2013  (JP) ................... 2013-190219

(51) Int. Cl.
  *H04N 9/64*   (2006.01)
  *H04N 5/361*  (2011.01)
  *H04N 5/357*  (2011.01)

(52) U.S. Cl.
  CPC ............ *H04N 5/361* (2013.01); *H04N 5/3572* (2013.01)

(58) Field of Classification Search
  CPC ... H04N 5/361; H04N 5/2176; H04N 5/2178
  USPC .................................................. 348/243, 245
  See application file for complete search history.

(56) References Cited

U.S. PATENT DOCUMENTS

| | | | | |
|---|---|---|---|---|
| 7,623,164 B2* | 11/2009 | Takeda | ........... | H04N 5/361 348/243 |
| 2004/0252204 A1* | 12/2004 | Kurane | ........... | H04N 5/361 348/222.1 |
| 2006/0044424 A1* | 3/2006 | Shirai | ........... | H04N 5/3658 348/241 |
| 2008/0218615 A1* | 9/2008 | Huang | ........... | H04N 5/2176 348/294 |
| 2009/0040328 A1* | 2/2009 | Suzuki | ........... | H04N 5/361 348/222.1 |
| 2010/0026860 A1* | 2/2010 | Oshima | ........... | H04N 5/361 348/243 |
| 2012/0147210 A1* | 6/2012 | Miyashita | ........... | H04N 5/361 348/223.1 |
| 2013/0010166 A1* | 1/2013 | Morisaki | ........... | H04N 5/361 348/294 |

FOREIGN PATENT DOCUMENTS

JP    2010-147638    7/2010

* cited by examiner

*Primary Examiner* — Sinh Tran
*Assistant Examiner* — Zhenzhen Wu
(74) *Attorney, Agent, or Firm* — Renner, Otto, Boisselle & Sklar, LLP

(57) ABSTRACT

An imaging device includes an effective pixel region outputting an effective pixel signal, a first shielded pixel region outputting a shielded pixel signal before the effective pixel signal is output, and a second shielded pixel region outputting a shielded pixel signal after the effective pixel signal has been output. In the device, in a steady state, frame clamping is performed using a clamping reference value generated from the pixel signals of the second shielded pixel region. A frame in a transition state in which the optical black signal level of the imaging device changes is subjected to frame clamping using a clamping reference value generated from the pixel signals of the first shielded pixel region.

10 Claims, 13 Drawing Sheets

CLAMPING METHOD

CROSS-REFERENCE TO RELATED APPLICATION

This application claims priority to Japanese Patent Application No. 2013-113714 filed on May 30, 2013 and Japanese Patent Application No. 2013-190219 filed on Sep. 13, 2013, the entire disclosure of which is incorporated by reference herein.

BACKGROUND

The present disclosure relates to methods of clamping image signals in imaging devices and imaging systems using the imaging devices.

Japanese Unexamined Patent Publication No. 2010-147638 shows a clamping method reducing vertical shading of images even when an extremely large dark current is generated.

SUMMARY

The present disclosure provides a clamping method, which reduces influence of random noise, and reduces variations in the black signal level of an image signal even if the storage time of an imaging device changes.

A clamping method according to a first aspect of the present disclosure is performed in outputting an image signal of each of successive frames using an imaging device. The device includes an effective pixel region outputting an effective pixel signal obtained by imaging an object, and a first shielded pixel region outputting a shielded pixel signal before the effective pixel signal is output, where photoelectric conversion elements are arranged two-dimensionally. The method includes first clamping determining an optical black signal level of the effective pixel signal by subtracting a first reference value RA(n) from the effective pixel signal of a present frame (n), and then adding a predetermined target value to a result of the subtraction. The value RA(n) is obtained by performing first stabilization of a first average value A(n) calculated by averaging first reference value calculation pixel signals of the first reference value calculation region including shielded pixels of the first shielded pixel region of the present frame (n).

As a clamping method according to a second aspect of the present disclosure, in the first aspect, the imaging device further includes a second shielded pixel region outputting a shielded pixel signal after the effective pixel signal has been output. In a steady state in which an optical black signal level of the image signal of the present frame (n) does not change, second clamping is performed to determine the optical black signal level of the effective pixel signal by subtracting a second reference value RB(n) from an effective pixel signal of a subsequent frame (n+1), and then adding a predetermined target value to a result of the subtraction. The value RB(n) is obtained by performing second stabilization of a second average value B(n) calculated by averaging second reference value calculation pixel signals of a second reference value calculation region including at least shielded pixels of the second shielded pixel region. In a transition state in which the optical black signal level of the image signal of the present frame (n) changes, the first clamping is performed.

A clamping method according to a third aspect of the present disclosure is performed in outputting an image signal of each of successive frames using an imaging device. The device includes an effective pixel region outputting an effective pixel signal obtained by imaging an object, and a second shielded pixel region outputting a shielded pixel signal after the effective pixel signal has been output. The device selectively further includes a first shielded pixel region outputting a shielded pixel signal before the effective pixel signal is output. The method includes third clamping determining an optical black signal level of the effective pixel signal by subtracting a second reference value RB(n−1) from an entire image signal of a present frame (n), and then adding a predetermined target value to a result of the subtraction. The value RB(n−1) is obtained by performing second stabilization of a second average value B(n−1) calculated in a previous frame (n−1), by averaging second reference value calculation pixel signals of a second reference value calculation region including at least shielded pixels of the second shielded pixel region. The method further includes clamp correction performed to correct the optical black signal level of the effective pixel signal by subtracting a clamp correction value from the effective pixel signal after the third clamping. The clamp correction value is obtained by subtracting a predetermined target value from a sum of a predetermined correction average value RBC and a fourth average value calculated by averaging third reference value calculation pixel signals of a third reference value calculation region including shielded pixels in at least one of the first shielded pixel region or the second shielded pixel region of the present frame (n) after the third clamping.

As described above, the present disclosure provides a clamping method which outputs a stable image signal without changing the clamped black signal level of an effective pixel region, even when the storage time of an imaging device changes. Therefore, the present disclosure is greatly advantageous in imaging while changing the frame rate.

DETAILED DESCRIPTION

Embodiments are described in detail below with reference to the attached drawings. However, unnecessarily detailed description may be omitted. For example, detailed description of well known techniques or description of the substantially same elements may be omitted. Such omission is intended to prevent the following description from being unnecessarily redundant and to help those skilled in the art easily understand it.

Inventor provides the following description and the attached drawings to enable those skilled in the art to fully understand the present disclosure. Thus, the description and the drawings are not intended to limit the scope of the subject matter defined in the claims.

The embodiments will be described hereinafter with reference to FIG.S. 1-20.

Figure 1:
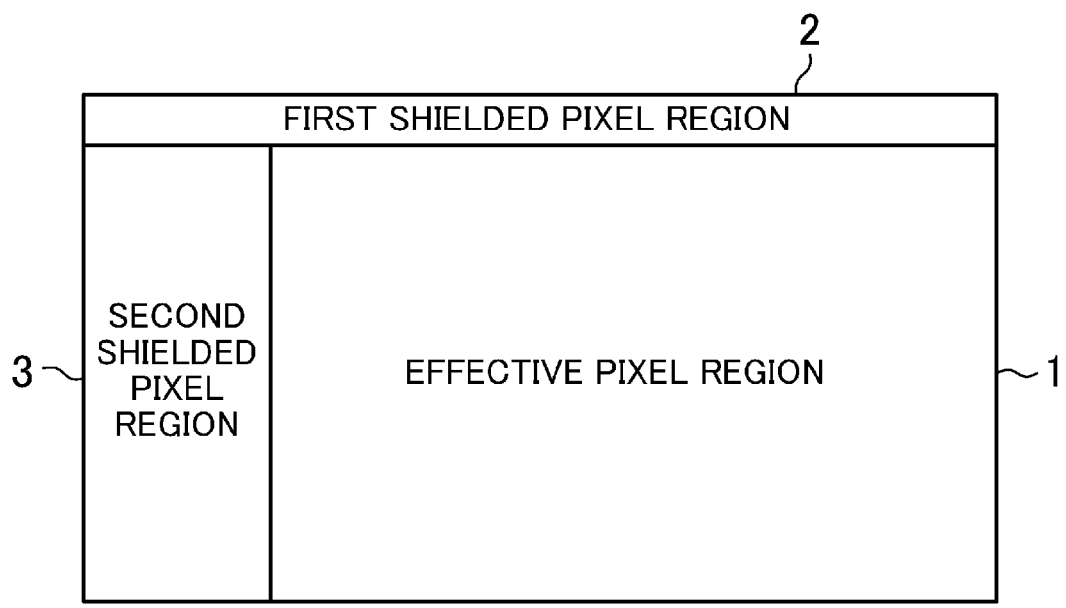
FIG. 1 illustrates a pixel configuration of an imaging device used in each embodiment.

FIG. 1 illustrates a configuration of an imaging device used in each embodiment. As shown in FIG. 1, the imaging device used in each embodiment includes an effective pixel region 1 outputting an effective pixel signal, a first shielded pixel region 2 outputting a shielded pixel signal before the effective pixel signal is output, and a second shielded pixel region 3 outputting a shielded pixel signal after the effective pixel signal has been output.

First Embodiment

Figure 2:
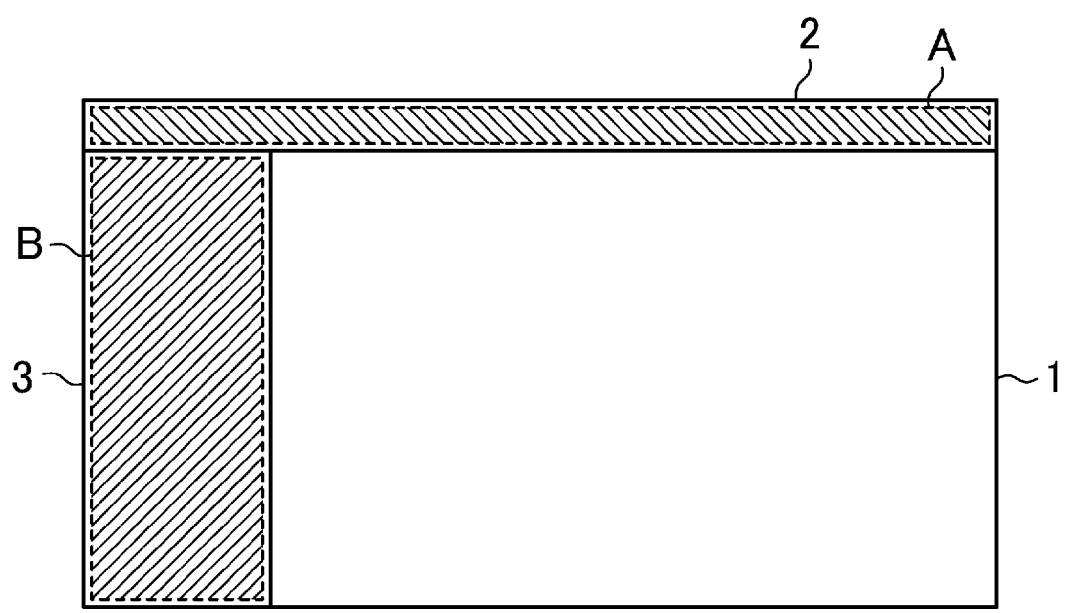
FIG. 2 illustrates shielded pixel regions used for calculating reference values in a first embodiment.

FIG. 2 illustrates shielded pixel regions used for calculating reference values in a first embodiment. As shown in FIG. 2, a clamping method according to the first embodiment defines a first reference value calculation region (i.e., a shaded portion A) to include shielded pixels of the first shielded pixel region 2, and a second reference value calculation region (i.e., a shaded portion B) to include shielded pixels of the second shielded pixel region 3.

Figure 3:
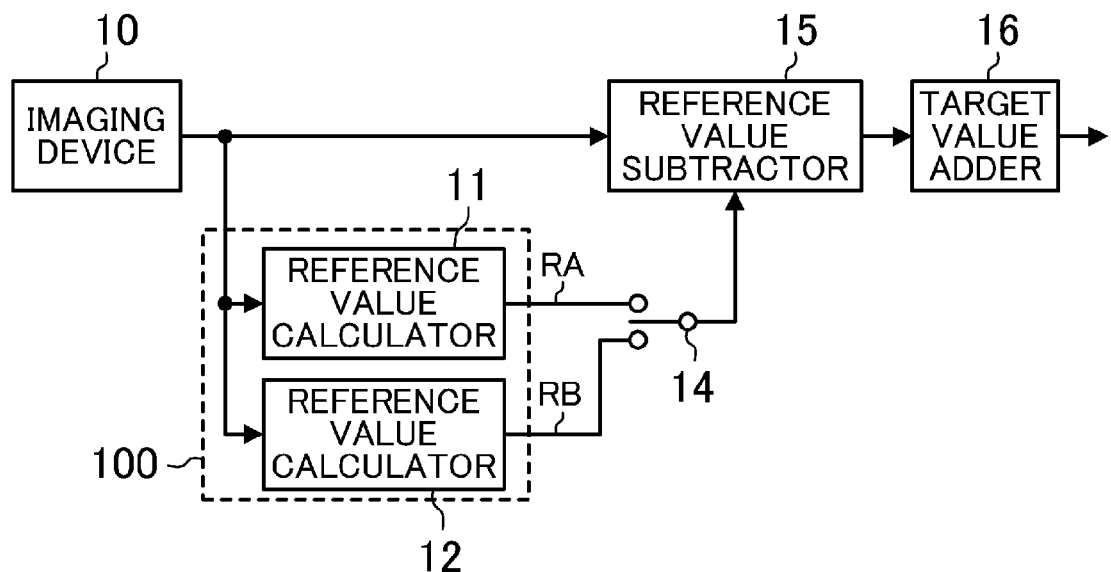
FIG. 3 is a block diagram illustrating an example configuration of a clamping circuit implementing a clamping method according to the first embodiment.

FIG. 3 is a block diagram illustrating an example configuration of a clamping circuit implementing the clamping method according to the first embodiment. As shown in FIG. 3, the clamping circuit according to the first embodiment includes an imaging device 10, a first reference value calculator 11, a second reference value calculator 12, a first selector 14, a reference value subtractor 15, and a target value adder 16. In the following description, the first reference value calculator 11 and the second reference value calculator 12 may be collectively referred to as a "reference value calculator 100."

The imaging device 10 sequentially outputs pixel signals to scan pixels of FIG. 1 from a higher-order line to a lower-order line, and from a left pixel to a right pixel in each line. The first reference value calculator 11 calculates a first reference value RA from a pixel signal of a first reference value calculation region A, which is output from the imaging device 10. The second reference value calculator 12 calculates a second reference value RB from a pixel signal of the second reference value calculation region B, which is output from the imaging device 10. The first selector 14 selects and outputs the first reference value RA or the second reference value RB. The reference value subtractor 15 subtracts the reference value selected by the first selector 14 from the effective pixel signal output from the imaging device 10, and outputs the obtained value. The target value adder 16 adds a clamping target value to the effective pixel signal output from the reference value subtractor 15, and outputs the obtained value. The positional order of the reference value subtractor 15 and the target value adder 16 may change.

Using the clamping circuit with this configuration, the second reference value calculation region B generates as a second reference value RB(n), a signal level obtained by performing second stabilization of a second average value B(n). The value B(n) is calculated by averaging shielded pixels of the second reference value calculation region B once in each frame. Reference character "n" represents a frame number.

The second stabilization is processing for reducing variations in the second average value B(n) caused by influence of random noise, etc., and the function is switchable between an on state and an off state.

Figure 4:
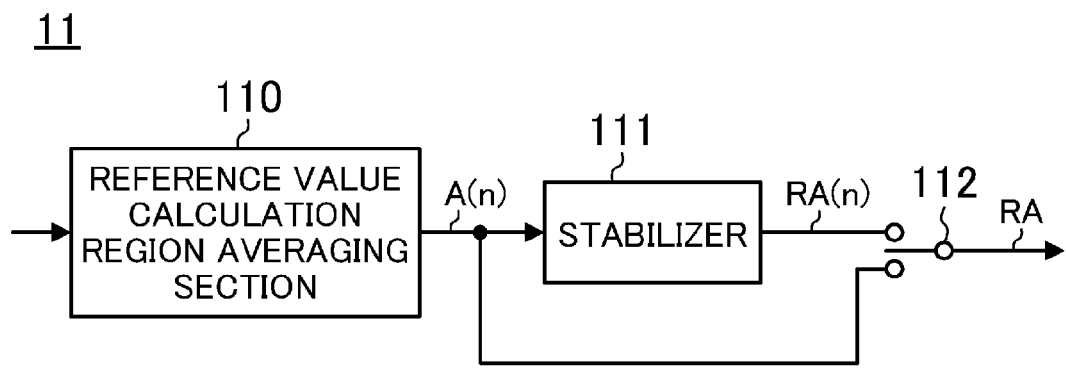
FIG. 4 is a block diagram illustrating an example configuration of a reference value calculator.

FIG. 4 is a block diagram illustrating an example configuration of the first reference value calculator 11 in the clamping circuit of FIG. 3. As shown in FIG. 4, the first reference value calculator 11 includes a reference value calculation region averaging section 110, a stabilizer 111, and a second selector 112.

The reference value calculation region averaging section 110 outputs an average value A(n) of pixel signals of the first reference value calculation region A, which are output from the imaging device 10. The stabilizer 111 stabilizes the average value A(n) output from the reference value calculation region averaging section 110 to reduce variations in the average value A(n) caused by influence of random noise, and outputs a first reference value RA(n). The second selector 112 performs processing corresponding to the on/off operation of stabilization of the average value A(n). The second selector 112 selects an output of the stabilizer 111 in the on state, and an output of the reference value calculation region averaging section 110 in the off state.

The second reference value calculator 12 has a configuration similar to that of the first reference value calculator 11. The explanation thereof is thus omitted.

When the second stabilization is in the on state, for example, the second average value B(n) of the present frame (n) and the second reference value RB(n-1) of the previous frame (n-1) are subjected to weighted averaging at a predetermined rate to obtain the second reference value RB(n) of the present frame (n). Specifically, as one method, infinite impulse response (IIR) is performed, which adds the value obtained by multiplying the second average value B(n) of the present frame (n) by a predetermined coefficient KB, where KB≤1, to the value obtained by multiplying the second reference value RB(n-1) of the previous frame (n-1) by a predetermined coefficient 1-KB. As a result, the second reference value of the present frame (n) is obtained as follows.

$$RB(n)=KB \times B(n)+(1-KB) \times RB(n-1) \quad (1)$$

Another possible method is to add or subtract a second change amount DB to or from the second reference value RB(n−1) calculated in the previous frame (n−1) so that the second reference value RB(n−1) is close to the second average value B(n) calculated in the present frame (n). As a result, the second reference value of the present frame (n) is obtained as follows.

$$RB(n)=RB(n-1)+DB$$

or $$RB(n-1)-DB$$

(Note that this second change amount DB is too small to be recognized in an image, even when there is a change in the black signal level of DB in one frame. When the difference between B(n) and RB(n−1) is smaller than DB, DB is not added or subtracted and the equation RB(n)=RB(n−1) is valid.)

On the other hand, when the second stabilization is in the off state, the second average value B(n) is output without change as the second reference value RB(n), which is expressed by $$RB(n)=B(n).$$

Figure 5:
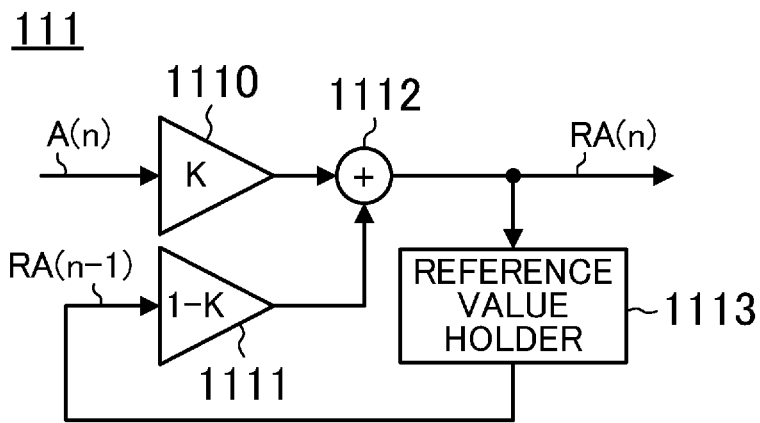
FIG. 5 is a block diagram illustrating an example configuration of a stabilizer.

FIG. 5 is a block diagram illustrating an example configuration of the stabilizer 111 in the first reference value calculator 11 shown in FIG. 4. As shown in FIG. 5, the stabilizer 111 includes a first coefficient multiplier 1110, a second coefficient multiplier 1111, a first adder 1112, and a reference value holder 1113.

The first coefficient multiplier 1110 multiplies the input average value A(n) by a predetermined coefficient K, where K≤1, and outputs the obtained value. The second coefficient multiplier 1111 multiplies the reference value RA(n−1) by a predetermined coefficient 1−K, and outputs the obtained value. The value RA(n−1) has been obtained previously, i.e., in the previous frame, and held in the reference value holder 1113. The first adder 1112 adds the output of the first coefficient multiplier 1110 to the output of the second coefficient multiplier 1111, and outputs the stabilized average value as the first reference value RA(n). The reference value holder 1113 holds the output of the first adder 1112 to the next, i.e., the subsequent frame. That is, as K comes closer to zero, the difference between the average value output from the stabilizer 111 and the reference value output previously becomes small. Thus, the average value becomes a stabilized value with small variations. The stabilization may be switched to the off state by the selection of the second selector 112, or by using the predetermined coefficient K=1.

Figure 6:
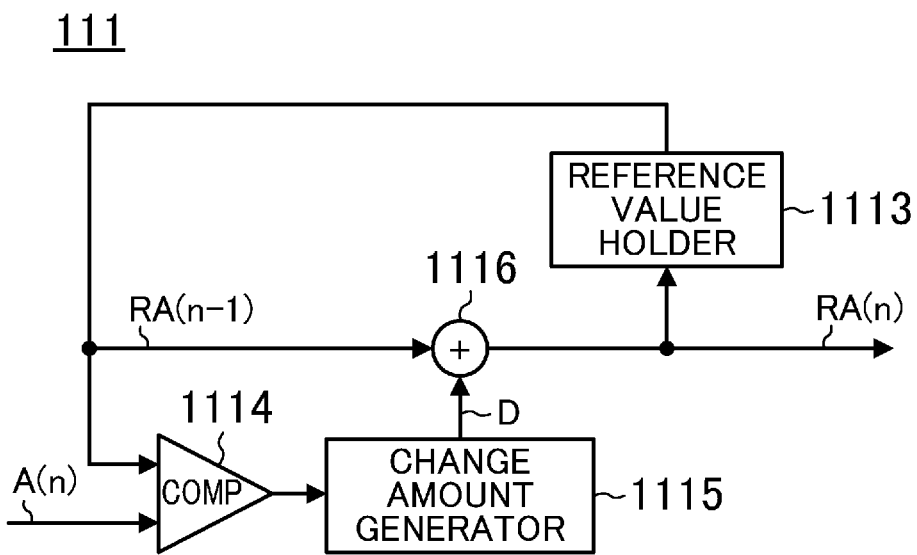
FIG. 6 is a block diagram illustrating another example configuration of the stabilizer.

FIG. 6 is a block diagram illustrating another example configuration of the stabilizer 111. As shown in FIG. 6, the stabilizer 111 includes a comparator 1114, a change amount generator 1115, a second adder 1116, and a reference value holder 1113.

The comparator 1114 compares the input average value A(n) to the reference value RA(n−1), which has been obtained previously, i.e., in the previous frame, and held in the reference value holder 1113. Then, the comparator 1114 outputs the determination as to whether or not the input average value A(n) is greater than the previous reference value RA(n−1). Based on the result input from the comparator 1114, the change amount generator 1115 outputs, as the change amount, +D, where D is a small positive number, when the average value A(n) is greater, and −D, when the average value A(n) is smaller. The absolute value D of this change amount is preferably too small to be recognized as an image even when the black signal level of the image signal varies by D in each frame.

As a result of the comparison with the comparator 1114, when the difference between the input average value A(n) and the previous reference value RA(n−1) is large, the absolute value D of the change amount may increase to follow the change in the average value A(n) in a short period. As a result of the comparison with the comparator 1114, when the difference between the input average value A(n) and the previous reference value RA(n−1) is small to some extent, the change amount D may be zero.

The second adder 1116 adds the change amount D output from the change amount generator 1115 to the previous reference value RA(n−1) held in the reference value holder 1113. The reference value holder 1113 holds the output of the second adder 1116 to the next, i.e., the subsequent frame. Thus, when the absolute value D of the change amount is small, the average value output from the stabilizer 111 becomes a stabilized value with small variations, since there is a small change from the reference value RA(n−1) output previously. The stabilization may be switched to the off state by the selection of the second selector 112 as described above, or by using the result of the comparison with the comparator 1114, i.e., the difference value between the input average value A(n) and the previous reference value RA(n−1), without change as the absolute value D of the change amount.

The first reference value calculation region A generates as the first reference value RA(n), the signal level obtained by performing first stabilization of the first average value A(n), which is calculated by averaging the shielded pixels of the first reference value calculation region A once in each frame.

Similar to the second stabilization, the first stabilization is processing for reducing variations in the first average value A(n) caused by influence of random noise, etc., and the function is switchable between an on state and an off state.

When the first stabilization is in the on state, for example, the first average value A(n) of the present frame (n) and the first reference value RA(n−1) of the previous frame (n−1) are subjected to weighted averaging at a predetermined rate to calculate the first reference value RA(n) of the present frame (n). Specifically, as one method, IIR is performed, which adds the value obtained by multiplying the first average value A(n) of the present frame (n) by a predetermined coefficient KA, where KA≤1, to the value obtained by multiplying the first reference value RA(n−1) of the previous frame (n−1) by a predetermined coefficient 1−KA. As a result, the first reference value of the present frame (n) is obtained as follows.

$$RA(n)=KA \times A(n)+(1-KA) \times RA(n-1) \qquad (3)$$

Another possible method is to add or subtract a first change amount DA to or from the first reference value RA(n−1) calculated in the previous frame (n−1) so that the first reference value RA(n−1) is close to the first average value A(n) calculated in the present frame (n). As a result, the first reference value of the present frame (n) is obtained as follows.

$$RA(n)=RA(n-1)+DA$$

or $$RA(n-1)-DA \qquad (4)$$

(Note that this first change amount DA is too small to be recognized in an image, even when there is a change in the black signal level of DA in one frame. When the difference between A(n) and RA(n−1) is smaller than DA, DA is not added or subtracted, and the equation RA(n)=RA(n−1) is valid.)

On the other hand, when the first stabilization is in the off state, the first average value A(n) is output without change as the first reference value RA(n), which is expressed by $$RA(n)=A(n).$$

The first clamping and the second clamping are performed in accordance with a change in the black signal level of the imaging device 10 using the first reference value RA(n) and the second reference value RB(n), which have been calculated in these manners.

Figure 7:
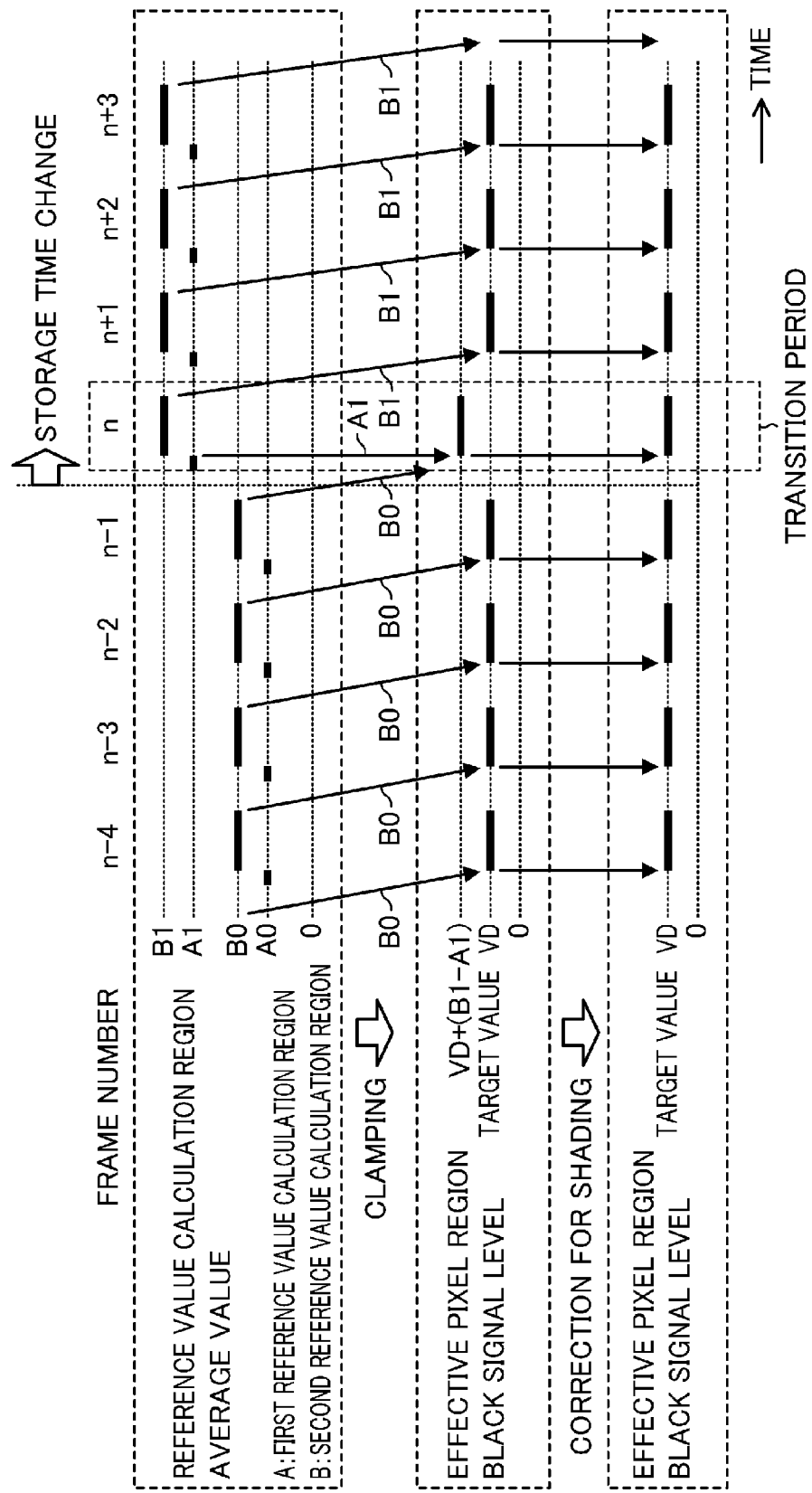
FIG. 7 illustrates a signal level change of an image signal in each frame, and clamping operation in the first embodiment.

FIG. 7 illustrates signal level changes of the image signals of the first reference value calculation region A, the second reference value calculation region B, and the effective pixel region 1 in the frames and the clamping operation. In FIG. 7, n−4, . . . , n−1, n, n+1, . . . , n+3 represent frame numbers of the image signals. As compared to the frames prior to the frame (n−1), the storage time of the imaging device 10 is long in the frame (n) and the subsequent frames. For example, (n) is the n-th frame.

For example, A0 and B0 are average values before the storage time of the imaging device 10 changes. A0 represents the average value in the first reference value calculation region A provided in the first shielded pixel region 2. B0 represents the average value in the second reference value calculation region B provided in the second shielded pixel region 3. A1 and B1 are average values after the storage time of the imaging device 10 has changed. A1 represents the average value in the first reference value calculation region A. B1 represents the average value in the second reference value calculation region B. As a result of an increase in the storage time, the signal levels in the first reference value calculation region A and the second reference value calculation region B increase. VD represents a target value of the clamping. The final black signal level in the effective pixel region 1 in the steady state is VD.

To simplify the explanation, an example will be described where the unclamped black signal level, which is the average value of the effective pixel region 1 when light is shielded by iris close etc., is equal to the average value in the second reference value calculation region B.

As shown at the uppermost stage of FIG. 7, the average value from frame (n−4) to frame (n−2) in the second reference value calculation region B is B0. The second reference value RB0 obtained by performing the second stabilization of this value is almost equal to B0 in the steady state. The second clamping is performed, which is indicated by arrows B0 in FIG. 7. In the second clamping, the second reference value RB0 is subtracted from each of the signals from the previous frames (n−3) to (n−1) in the effective pixel region 1, and then the target value VD is added to the result.

The clamped black signal level in the effective pixel region 1 from the frame (n−3) to the frame (n−1) is as shown at the intermediate stage of FIG. 7, expressed by $$VD+(B0-RB0)=VD.$$

The second reference value generated in the frame (n−1) is also RB0. Since in the frame (n), to which the reference value is applied, the signal level of the shielded pixels near the effective pixel region 1 before clamping is B1, VD is not zero even after subtracting the reference value RB0. Where the effective pixel region 1 of the frame (n) is subjected to the second clamping, the black signal level is expressed by $$VD+(B1-RB0).$$

RA1 is a first reference value which is output before the effective pixel signal is output, after the storage time of the imaging device 10 has changed. In the frame (n), the second clamping is switched to first clamping, which is indicated by an arrow A1 in FIG. 7. In the first clamping, the first reference value RA1 is subtracted from the signal of the effective pixel region 1 of the frame (n), and then the target value VD is added to the result.

The first reference value RA(n) and the second reference value RB(n) are obtained in each frame by performing the first stabilization of the average value A(n) in the first reference value calculation region A, and the second stabilization of the average value B(n) in the second reference value calculation region B, respectively. However, in a transition state in which the black signal level of the imaging device 10 changes, the stabilization cannot follow immediately. Thus, the processing is performed only in the frames, which are switched to the first clamping, with the first stabilization and the second stabilization kept in the off state, i.e., based on the equations RA1=A1 and RB1=B1.

As a result, in the frame (n), where the average value A1 in the first reference value calculation region A is equal to the average value B1 in the second reference value calculation region B, the first clamped black signal level is VD.

The signal level in the shielded pixel region is different from imaging device 10 to imaging device 10 depending on the location of the pixels due to influence of shading etc. Thus, the black signal level of the effective pixel region 1 after the first clamping is expressed by VD+(B1−A1). As compared to an ideal black signal level after clamping, (B1−A1) corresponding to the shading remains.

In order to correct the shading, in the first clamping, a correction reference value RBA is subtracted from the signal of the effective pixel region 1, thereby obtaining the black signal level VD.

The influence of shading is considered as changing with a temperature of the imaging device 10. The correction reference value RBA may be set in advance to a predetermined value at each temperature of the imaging device 10. Alternatively, the difference between the second reference value RB(n) and the first reference value RA(n) may be calculated in each frame, and the correction reference value RBA may be calculated from the difference RB0−RA0 in the frame (n−1), immediately before the present frame.

Figure 8:
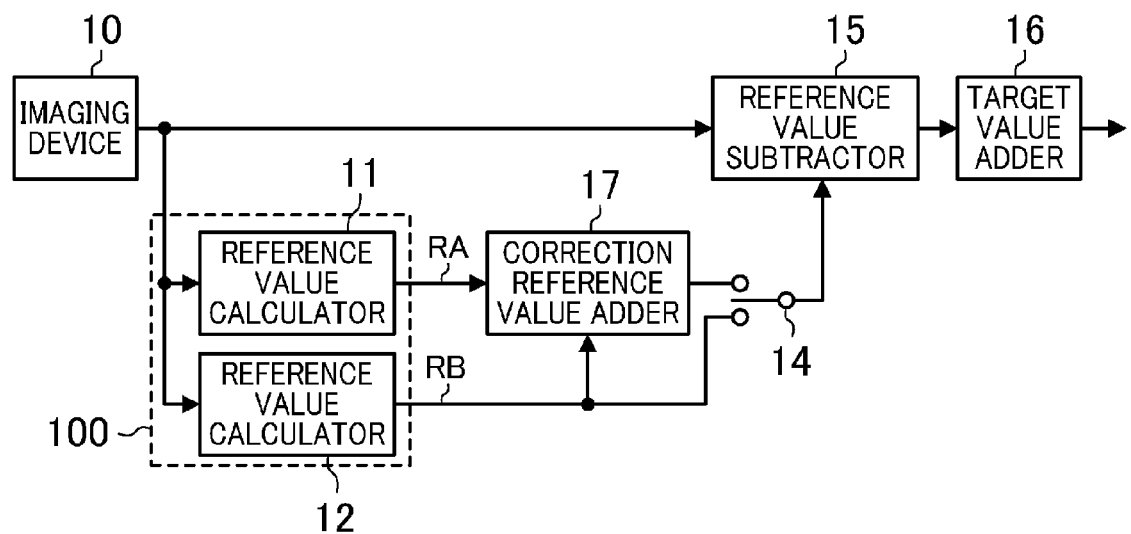
FIG. 8 is a block diagram illustrating another example configuration of the clamping circuit implementing the clamping method according to the first embodiment.

FIG. 8 is a block diagram illustrating an example configuration of a clamping circuit where the difference between the second reference value RB and the first reference value RA is calculated as the correction reference value RBA in each frame. The clamping circuit shown in FIG. 8 includes an imaging device 10, a first reference value calculator 11, a second reference value calculator 12, a first selector 14, a reference value subtractor 15, a target value adder 16, and a correction reference value adder 17.

The correction reference value adder 17 receives outputs of the first reference value calculator 11 and the second reference value calculator 12, and outputs the correction reference value RBA. The elements other than the correction reference value adder 17 are the same as those in the clamping circuit of FIG. 3. The explanation thereof is thus omitted.

Figure 9:
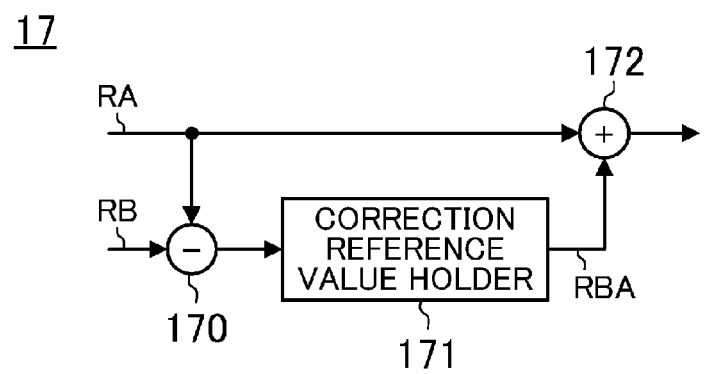
FIG. 9 is a block diagram illustrating an example configuration of a correction reference value adder.

FIG. 9 is a block diagram illustrating an example configuration of the correction reference value adder 17 in the clamping circuit of FIG. 8. As shown in FIG. 9, the correction reference value adder 17 includes a first subtractor 170, a correction reference value holder 171, and a third adder 172.

The first subtractor 170 subtracts the first reference value RA from the input second reference value RB, and outputs the result. The correction reference value holder 171 holds the output of the first subtractor 170 to the next, i.e., the subsequent frame, and then outputs as the correction reference value RBA. Where the difference between the first reference value RA and the second reference value RB changes depending on the drive conditions of the imaging device 10, the calculated correction reference value RBA may be multiplied by a corresponding gain or may be subjected to offset adjustment. The third adder 172 adds the correction reference value RBA to the input first reference value RA, and outputs the result.

Thus, the correction reference value RBA is the difference between the first reference value RA and the second reference value RB of the previous frame. As long as the relation does not change, the subtraction of the sum of the first reference value RA and the correction reference value RBA from the effective pixel signal corresponds to the subtraction of the second reference value RB from the effective pixel signal.

Then, in the frame (n+1) and the subsequent frames, the black signal level of the imaging device 10 is in the steady state. By switching to the second clamping again, the second reference value RB1 generated in the shielded pixel region of the frame (n) and the subsequent frames is applied. Thus, the black signal level of the effective pixel region 1 after the second clamping is expressed by $$VD+(B1-RB1)=VD.$$

Figure 10:
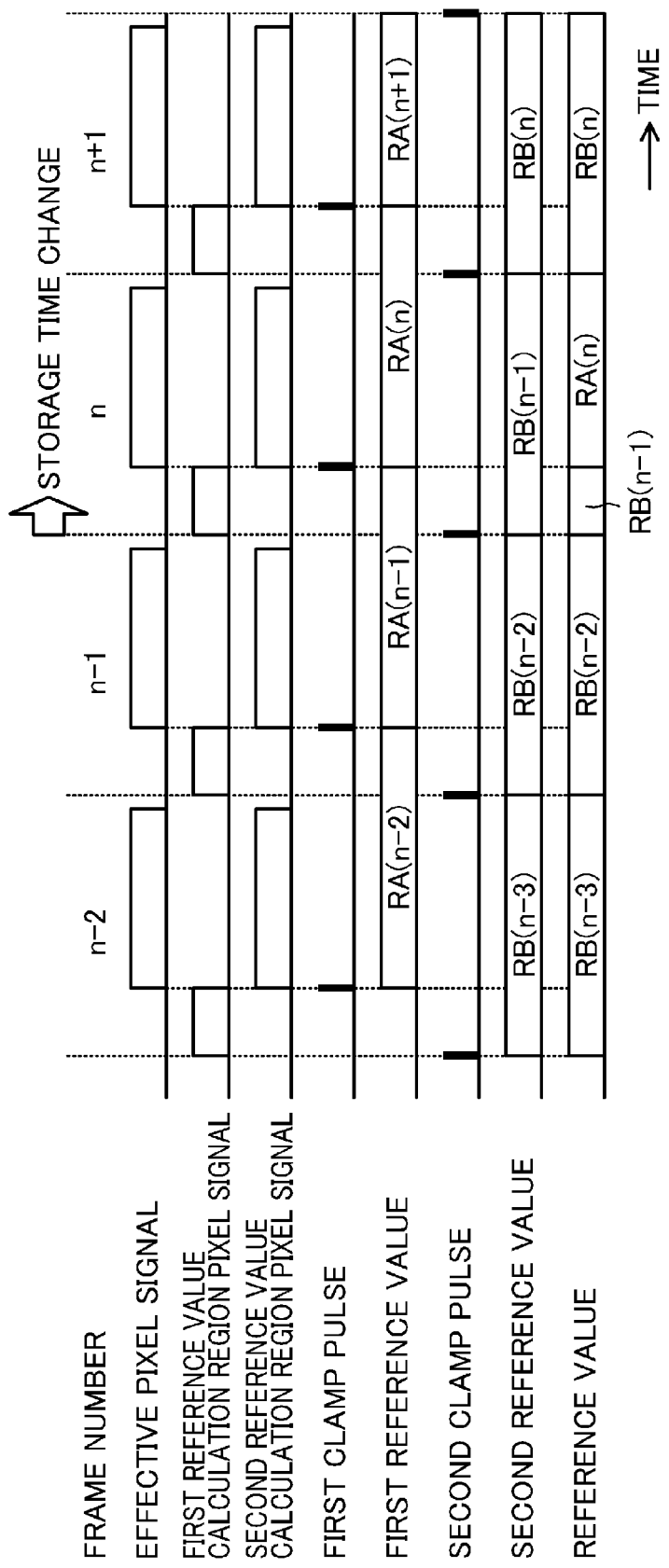
FIG. 10 illustrates switching operation in clamping in the first embodiment.

FIG. 10 illustrates that the second reference value is changed to the first reference value by switching from the second clamping to the first clamping. As shown in FIG. 10, the first reference value is updated at the timing of outputting all the pixel signals of the first reference value calculation region A, i.e., the timing expressed by a first clamp pulse. The second reference value is updated at the timing of outputting all the pixel signals of the second reference value calculation region B, i.e., the timing expressed by a second clamp pulse. As the reference value, the second reference value RB is used at the timing of the second clamp pulse in each frame. In the frame (n), which is in the transition state, the first reference value RA is used at the timing of the first clamp pulse.

Where the timing of changing the black signal level is clear in advance, for example, when the drive state of the imaging device 10 changes, the second clamping and the first clamping may be switched at that timing.

Alternatively, the average value A(n) or the first reference value RA(n) in the first reference value calculation region A may be monitored, and the second clamping and the first clamping may be switched upon detecting a change in the black signal level of the imaging device 10 based on a change in the monitored value.

Figure 11:
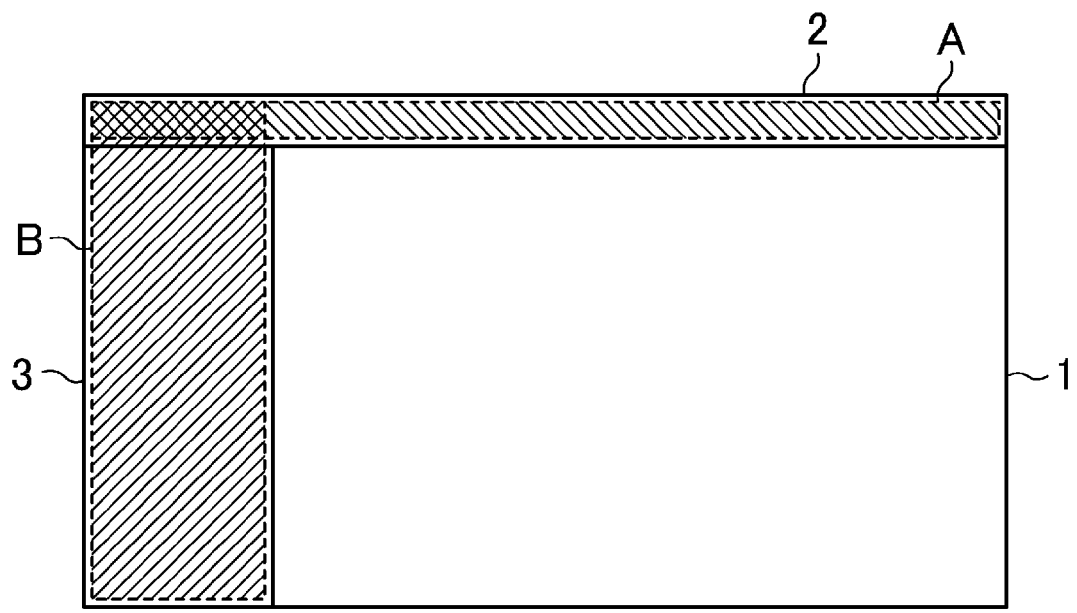
FIG. 11 illustrates shielded pixel regions used for calculating reference values in a variation of the first embodiment.

FIG. 11 illustrates a shielded pixel region used for calculating reference values in a variation of the first embodiment. FIG. 2 illustrates that the second reference value calculation region (i.e., the shaded portion B) does not include the shielded pixels of the first shielded pixel region 2. On the other hand, as shown in FIG. 11, the second reference value calculation region B includes the shielded pixels of the first shielded pixel region 2 to use more pixels for generating the average value B(n) in the second reference value calculation region B, thereby reducing influence of random noise etc.

Figure 12:
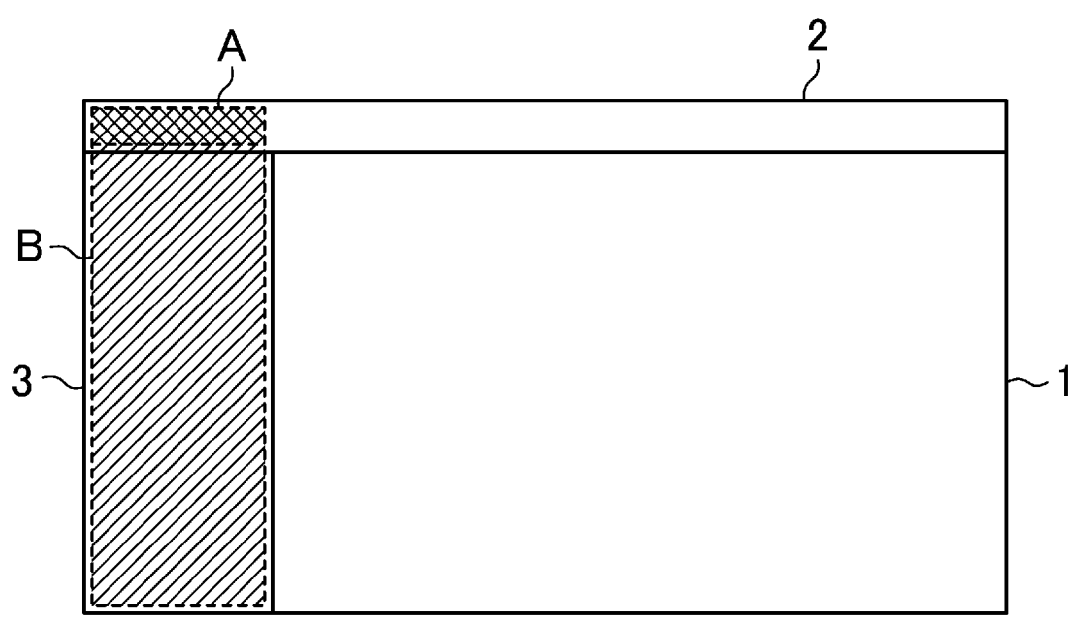
FIG. 12 illustrates shielded pixel regions used for calculating reference values in another variation of the first embodiment.

FIG. 12 illustrates shielded pixel regions used for calculating reference values in another variation of the first embodiment. As shown in FIG. 12, the first reference value calculation region (i.e., the shaded portion A) is part of the second reference value calculation region (i.e., the shaded portion B). Both of the adder of the first reference value calculation region A and the adder of the second reference value calculation region B are used to start the addition at the same time. At the end of the addition of the first reference value calculation region A, the average value A(n) in the first reference value calculation region A is calculated and held. Then, the addition of the second reference value calculation region B continues to calculate the average value B(n) in the second reference value calculation region B. This reduces the circuit scale.

Figure 13:
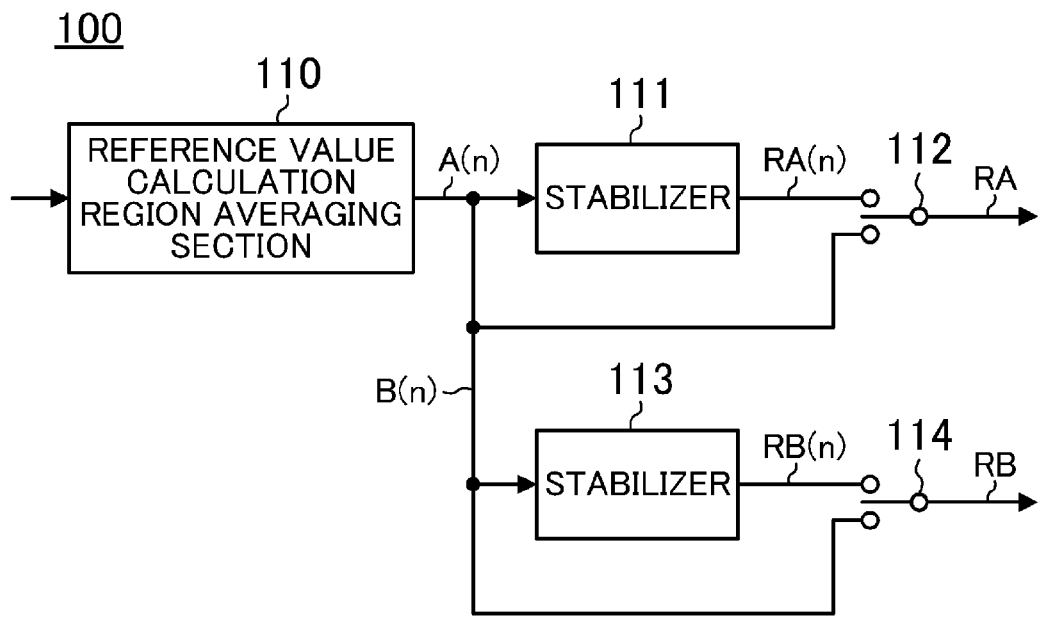
FIG. 13 is a block diagram illustrating another example configuration of the reference value calculator.

FIG. 13 is a block diagram illustrating an example configuration of a reference value calculator 100 including both functions of the first reference value calculator 11 and the second reference value calculator 12 in the clamping circuits of FIG.S. 3 and 8. As shown in FIG. 13, the reference value calculator 100 includes a reference value calculation region averaging section 110, stabilizers 111 and 113, and second selectors 112 and 114.

Where the first reference value calculation region A and the second reference value calculation region B are defined as shown in FIG. 2, the reference value calculation region averaging section 110 outputs the average value A(n) of the pixel signals of the first reference value calculation region A output from the imaging device 10. Then, the reference value calculation region averaging section 110 starts the addition of the pixel signals of the second reference value calculation region B, and, after completion, outputs the average value B(n) of the pixel signals of the second reference value calculation region B. In FIG. 12, addition of the pixel signals of the first reference value calculation region A, and the addition of the pixel signals of the second reference value calculation region B start at the same time. On the way, the average value A(n) of the pixel signals of the first reference value calculation region A is output, and then, the addition of the pixel signals of the second reference value calculation region B is performed, and, after completion, the average value B(n) of the pixel signals of the second reference value calculation region B is output. That is, the reference value calculation region averaging section 110 performs both of the addition in the first reference value calculation region A and the addition in the second reference value calculation region B, thereby reducing the circuit scale.

The stabilizer 111 performs stabilization of the average value A(n) of the pixel signals of the first reference value calculation region A, and outputs the obtained value while reducing variations in the average value A(n) caused by influence of random noise. The second selector 112 performs processing corresponding to on/off operation of the stabilization of the average value A(n). In the on state, the second selector 112 selects and outputs the output of the stabilizer 111. In the off state, the second selector 112 selects and outputs the average value A(n) of the pixel signals of the first reference value calculation region A, which is the output of the reference value calculation region averaging section 110. On the other hand, the stabilizer 113 performs stabilization of the average value B(n) of the pixel signals of the second reference value calculation region B, outputs the obtained value while reducing variations in the average value B(n) caused by influence of random noise. The second selector 114 performs processing corresponding to on/off operation of the stabilization of the average value B(n). In the on state, the second selector 114 selects and outputs the output of the stabilizer 113. In the off state, the second selector 114 selects and outputs the average value B(n) of the pixel signals of the second reference value calculation region B, which is the output of the reference value calculation region averaging section 110.

As described above, the method of clamping the image signal according to the first embodiment outputs the stable image signal without changing the clamped black signal level of the effective pixel region 1 even when the black signal level of the imaging device 10 changes.

Second Embodiment

As shown in FIG. 2, a clamping method according to a second embodiment defines a first reference value calculation region (i.e., a shaded portion A) to include shielded pixels of the first shielded pixel region 2.

Figure 14:
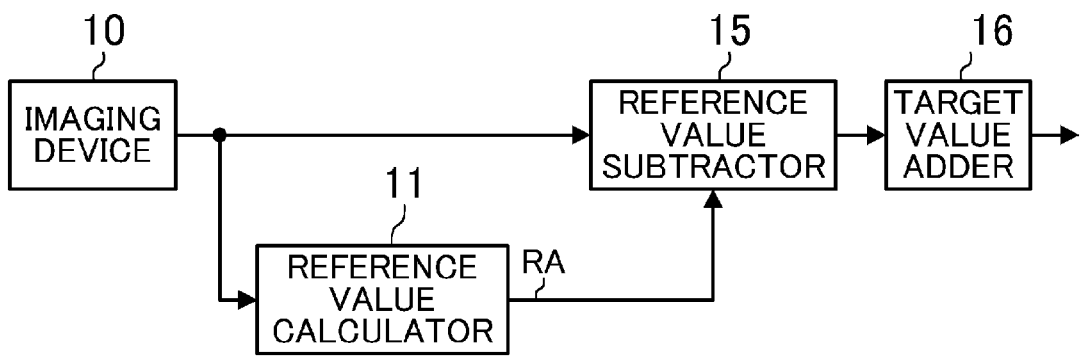
FIG. 14 is a block diagram illustrating an example configuration of a clamping circuit implementing a clamping method according to a second embodiment.

FIG. 14 is a block diagram illustrating an example configuration of a clamping circuit implementing the clamping method according to the second embodiment. As shown in FIG. 14, the clamping circuit according to the second embodiment includes an imaging device 10, a first reference value calculator 11, a reference value subtractor 15, and a target value adder 16. Explanation for the imaging device 10, the first reference value calculator 11, the reference value subtractor 15, and the target value adder 16 is omitted, since they are similar to those in the clamping circuit according to the first embodiment shown in FIG. 3.

Different from the clamping circuit according to the first embodiment, the clamping circuit according to this embodiment does not include a first selector 14. Thus, the first clamping is always performed using the first reference value RA generated by the first reference value calculator 11. The off/on operation of the first stabilization is performed in accordance with presence or absence of a change in the black signal level of the imaging device 10, thereby stabilizing the black signal level and the capability of following a change in the first clamping.

The first reference value calculation region A generates as the first reference value RA(n), the signal level obtained by performing the first stabilization of a first average value A(n), which is calculated by averaging the shielded pixels of the first reference value calculation region A once in each frame.

Similar to the first embodiment, the first stabilization is switchable between the on state and an off state. When the first stabilization is in the off state, the first average value A(n) is output without change as the first reference value RA(n), which is expressed by $RA(n)=A(n)$.

With use of the first reference value RA(n), which have been calculated in this manner, the first clamping is always performed. The on/off operation of the first stabilization of the used first reference value RA(n) is performed in accordance with a change in the black signal level of the imaging device 10.

In a steady state in which the black signal level of the imaging device 10 does not change, the first stabilization is in the on state to subtract the first reference value RA(n) obtained while reducing the influence of random noise from the effective pixel signal successively output in the same frame, and then the target value VD is added to the result. In a transition state in which the black signal level of the imaging device 10 changes, the first stabilization is in the off state to subtract the average value A(n) in the first reference value calculation region A without change as the first reference value RA(n) from the effective pixel signal successively output in the same frame, and then the target value VD is added to the result.

Where the timing of changing the black signal level is clear in advance, for example, when the drive state of the imaging device 10 changes, the first stabilization may be switched between an on state and an off state at that timing.

Alternatively, the average value A(n) or the first reference value RA(n) in the first reference value calculation region A may be monitored, and the first stabilization may be switched between an on state and an off state upon detecting a change in the black signal level of the imaging device 10 based on a change in the monitored value.

As described above, in the steady state, the method performs stable clamping while reducing the influence of random noise, and immediately responds to variations in the black signal level.

As described above, the method of clamping the image signal according to the second embodiment outputs the stable image signal without changing the clamped black signal level of the effective pixel region 1 even when the black signal level of the imaging device 10 changes.

Third Embodiment

FIG.S. 15-17 illustrate shielded pixel regions used for calculating reference values in a third embodiment. As shown in FIG.S. 15-17, in a clamping method according to the third embodiment, a second reference value calculation region (i.e., a shaded portion B) is provided to include at least shielded pixels of the second shielded pixel region 3. A third reference value calculation region (i.e., a shaded portion C) is provided to include shielded pixels of at least one of the first shielded pixel region 2 or the second shielded pixel region 3.

Figure 18:
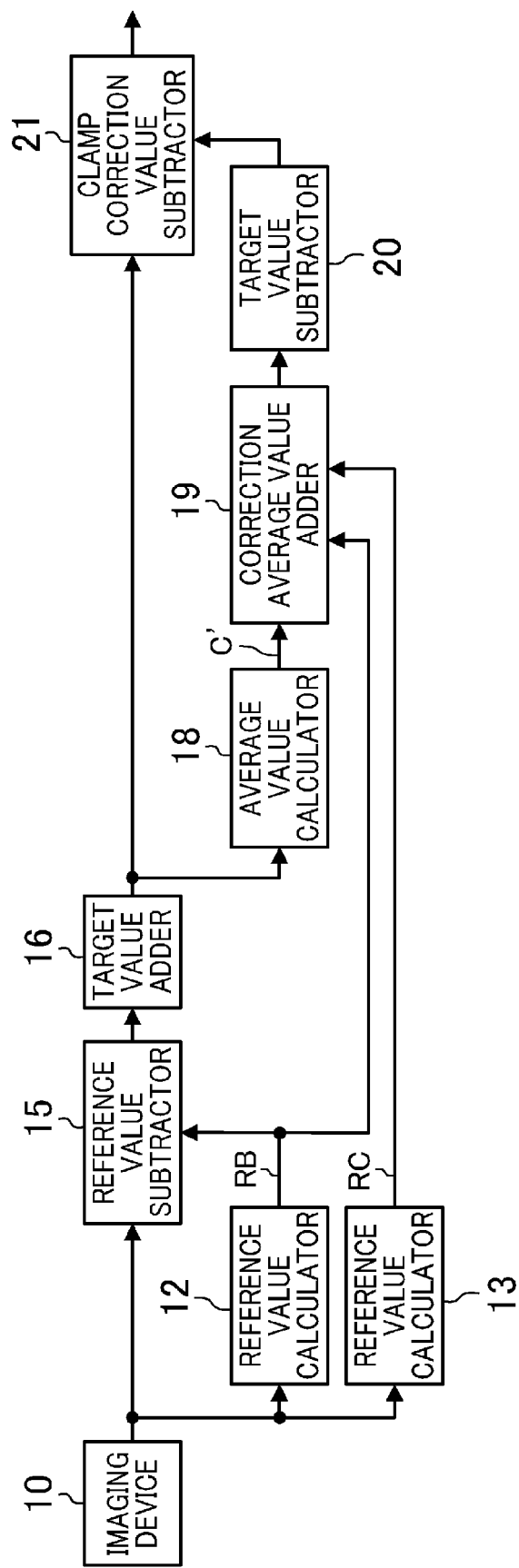
FIG. 18 is a block diagram illustrating an example configuration of a clamping circuit implementing a clamping method according to the third embodiment.

FIG. 18 is a block diagram illustrating an example configuration of a clamping circuit implementing the clamping method according to the third embodiment. As shown in FIG. 18, the clamping circuit according to the third embodiment includes an imaging device 10, a second reference value calculator 12, a third reference value calculator 13, a reference value subtractor 15, a target value adder 16, a fourth average value calculator 18, a correction average value adder 19, a target value subtractor 20, and a clamp correction value subtractor 21. The imaging device 10 and the second reference value calculator 12 are similar to those in the clamping circuit according to the first embodiment shown in FIG. 3, and the explanation is thus omitted.

The third reference value calculator 13 generates a third reference value RC from a pixel signal of a third reference value calculation region C output from the imaging device 10. The reference value subtractor 15 always subtracts the second reference value RB from the shielded pixel signal of the third reference value calculation region C in addition to the effective pixel signal output from the imaging device 10, and outputs the result. The target value adder 16 adds the target value of the clamping to the effective pixel signal output from the reference value subtractor 15 and the shielded pixel signal of the third reference value calculation region C, and outputs the result. As a result, at least the effective pixel signal output from the imaging device 10 and the pixel signal of the third reference value calculation region C are subjected to third clamping. The positional order of the reference value subtractor 15 and the target value adder 16 may change.

The fourth average value calculator 18 calculates a fourth average value C' from the pixel signal of the third reference value calculation region C after the third clamping, which is output from the target value adder 16. The correction average value adder 19 generates a correction average value RBC from the second reference value RB output from the second reference value calculator 12 and the third reference value RC output from the third reference value calculator 13. Then, the correction average value adder 19 adds the obtained value to the fourth average value C' output from the fourth average value calculator 18. The target value subtractor 20 subtracts the target value of the third clamping from the output of the correction average value adder 19, and outputs the result as a clamp correction value. The clamp correction value subtractor 21 subtracts the clamp correction value output from the target value subtractor 20 from the effective pixel signal after the third clamping, which is output from the target value adder 16.

In the clamping circuit with this configuration, the second reference value calculation region B generates as the second reference value RB(n), the signal level obtained by performing the second stabilization of the second average value B(n), which is calculated by averaging the shielded pixels of the second reference value calculation region B once in each frame.

The second stabilization is processing for reducing variations in the second average value B(n) caused by influence of random noise, etc., and the function is switchable between an on state and an off state. The second stabilization is implemented similarly to the first embodiment. The third clamping is performed using the second reference value RB(n) obtained in this manner.

Figure 19:
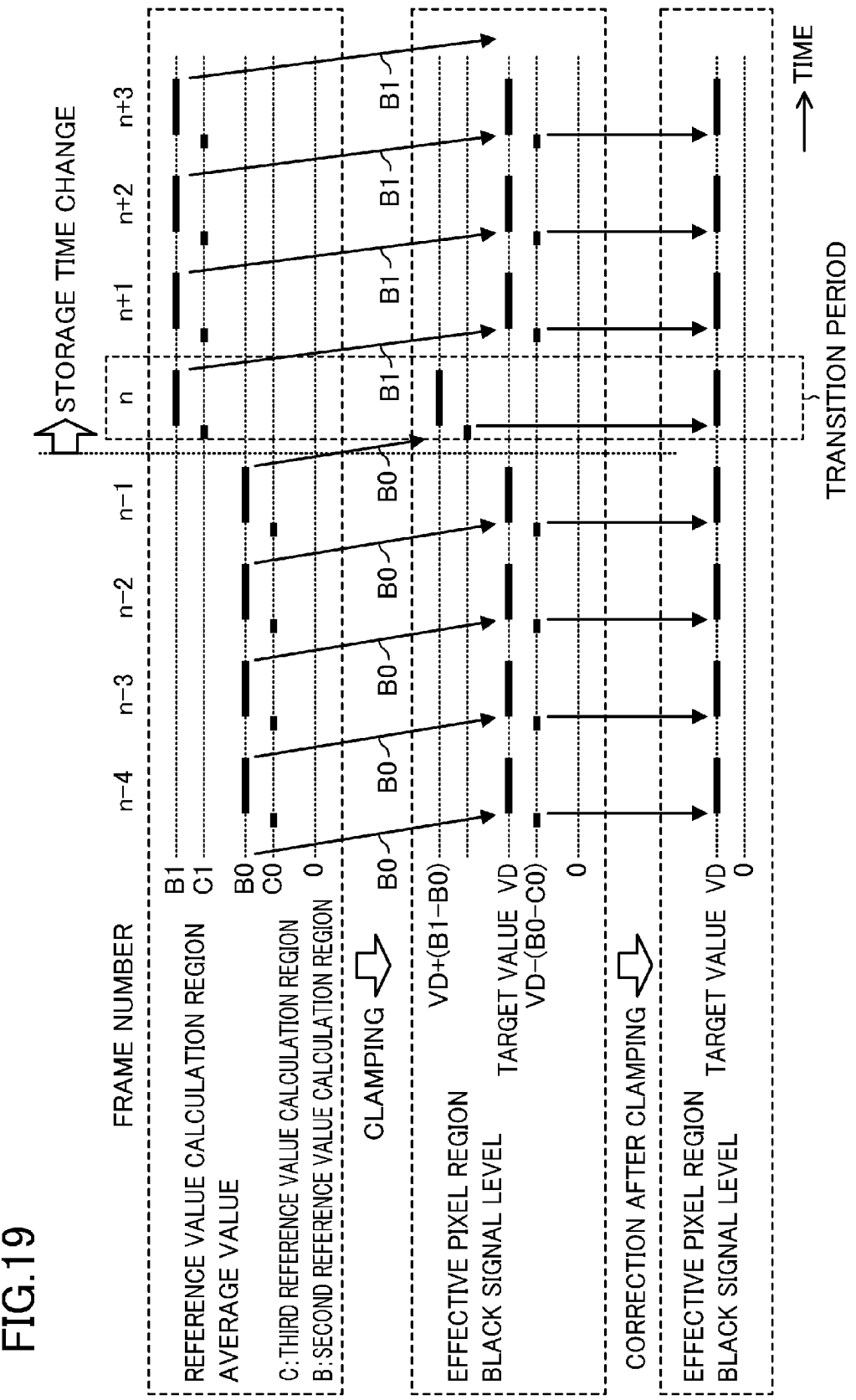
FIG. 19 illustrates a signal level change of an image signal in each frame, and clamping operation in the third embodiment.

FIG. 19 illustrates signal level changes of image signals of the third reference value calculation region C, the second reference value calculation region B, and the effective pixel region 1 of the frames, and the clamping operation. In FIG. 19, n−4, . . . , n−1, n, n+1, . . . , n+3 represent frame numbers of the image signals. As compared to the frames prior to the frame (n−1), the storage time of the imaging device 10 is long in the frame (n) and the subsequent frames. For example, (n) is the n-th frame.

B0 represents the average value in the second reference value calculation region B, which has been defined in the second shielded pixel region 3 before the storage time of the imaging device 10 changes. B1 represents the average value in the second reference value calculation region B after the storage time of the imaging device 10 has changed. As a result of an increase in the storage time, the signal level in the second reference value calculation region B increases. VD represents a target value of the clamping. The final black signal level in the effective pixel region 1 in the steady state is VD.

To simplify the explanation, an example will be described where the unclamped black signal level, which is the average value in the effective pixel region 1 when light is shielded by iris close etc., is equal to the average value in the second reference value calculation region B.

As shown at the uppermost stage of FIG. 19, the average value from frame (n−4) to frame (n−2) in the second reference value calculation region B is B0. The second reference value RB0 obtained by performing the second stabilization of this value is almost equal to B0 in the steady state. The third clamping, which is indicated by arrows B0 in FIG. 19, is performed, which subtracts the second reference value RB0 from the signals of the effective pixel region 1 and the third reference value calculation region C from frame (n−3) to the previous frame (n−1) and adds the target value VD to the obtained value.

As shown at the intermediate stage of FIG. 19, the clamped black signal level of the effective pixel region 1 from the frame (n−3) to the frame (n−1) is expressed by $$VD+(B0-RB0)=VD.$$

The second reference value generated in the frame (n−1) is also RB0. Since in the frame (n), to which the reference value is applied, the signal level of the shielded pixels near the effective pixel region 1 before clamping is B1, VD is not zero even after subtracting the reference value RB0. Where the effective pixel region 1 of the frame (n) is subjected to the third clamping, the black signal level is expressed by $$VD+(B1-RB0).$$

The second reference value RB(n) is obtained in each frame by performing second stabilization of the average value B(n) in the second reference value calculation region B. However, in a transition state in which the black signal level of the imaging device 10 changes, the stabilization cannot follow immediately. Thus, only in the frames in the transition state, the second stabilization is in the off state. That is, the processing is performed based on the equation RB1=B1.

In addition to the pixel signal of the effective pixel region 1, the pixel signal of the third reference value calculation region C is subjected to the third clamping.

If the black signal level of the imaging device 10 does not change, the black signal levels of the effective pixel region 1 and the second reference value calculation region B are equal to the target value VD of the clamping as a result of the third clamping. The fourth average value, which is the average value in the third reference value calculation region C after the third clamping is obtained by VD−RBC0, where the difference between the original average value C0 in the third reference value calculation region C before the third clamping, and the average value B0 in the second reference value calculation region B before the third clamping is expressed by $$RBC0(RBC0=B0-C0).$$

On the other hand, in the frame (n), which is in the transition state in which the black signal level of the imaging device 10 changes, the black signal levels of the effective pixel region 1 and the second reference value calculation region B are $$VD+(B1-B0)$$

as a result of the third clamping. The fourth average value is obtained by $$VD+(B1-B0)-RBC1,$$

where the difference between the average value C1 in the third reference value calculation region C before the third clamping and the average value B1 in the second reference value calculation region B before the third clamping is expressed by $$RBC1(RBC1=B1-C1).$$

Therefore, the difference between the clamped black signal level in the frame (n) and the target value VD is corrected in the processing at a later stage, thereby reducing variations in the black signal level of the final output of the imaging system, even when the black signal level of the imaging device 10 changes.

Figure 15:
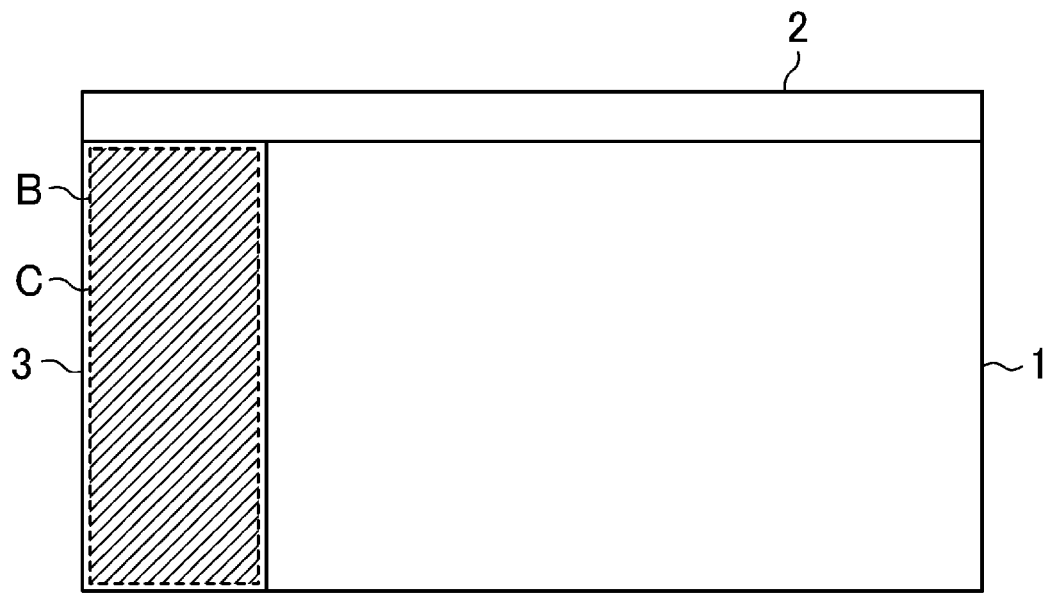
FIG. 15 illustrates shielded pixel regions used for calculating reference values in a third embodiment.

At this time, as shown in FIG. 15, where the third reference value calculation region (i.e., the shaded portion C) is identical with the second reference value calculation region (i.e., the shaded portion B), the difference between the average values in the both regions before the third clamping is zero. Thus, the fourth average value is expressed by $$VD+(B1-B0)-RBC1=VD+(B1-B0).$$

The value obtained by subtracting the target value VD from the fourth average value is used as a clamp correction value. Clamp correction is performed to subtract this value from the pixel signal of the effective pixel region 1 after the third clamping. As a result, the black signal level of the effective pixel region 1 is equal to the target value VD.

The fourth average value is generated after all the pixel signals of the third reference value calculation region C in the frame (n) have been output, there is a need to perform the above-described clamp correction while delaying the pixel signals of the effective pixel region 1 in the frame (n). If other signal processing is performed between the third clamping and the clamp correction, the clamp correction value needs to be subjected to equivalent signal processing. For example, if the other signal processing is gain adjustment for the pixel signals of the effective pixel region 1, the clamp correction value may also be subjected to equivalent gain adjustment to perform the clamp correction.

Figure 16:
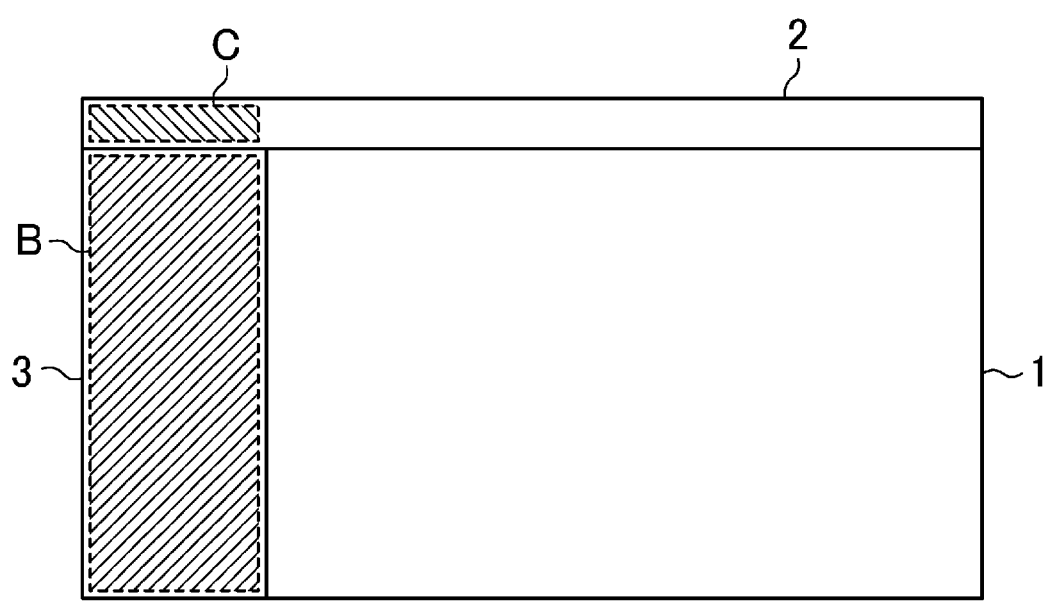
FIG. 16 illustrates shielded pixel regions used for calculating reference values in a variation of the third embodiment.

On the other hand, as shown in FIG. 16, if the third reference value calculation region (i.e., the shaded portion C) is defined in the first shielded pixel region 2, there is no need to delay the pixel signals of the effective pixel region 1 of the frame (n). However, since the position of the third reference value calculation region is different from that of the second reference value calculation region B, the difference RBC 1 may not be zero due to influence of shading etc.

The value corresponding to the difference is, as a correction average value RBC, add to the fourth average value obtained by VD+(B1−B0)−RBC1. The value obtained by subtracting the target value VD from the sum is used as a clamp correction value. Clamp correction is performed, which subtracts this value from the pixel signals of the effective pixel region 1 after the third clamping. As a result, the black signal level of the effective pixel region 1 is equal to the target value VD.

The influence of shading is considered as changing with a temperature of the imaging device 10. The correction average value RBC may be set in advance to a predetermined value RBC1 at each temperature of the imaging device 10.

Similar to the pixel signals of the second reference value calculation region B, the pixel signals of the third reference value calculation region C before the third clamping are averaged once in each frame to calculate a third average value C(n). The third average value C(n) is subjected to third stabilization to generate the signal level as the third reference value RC(n). The difference between the second reference value RB(n) and the third reference value RC(n) may be calculated in each frame, and the correction average value RBC may be calculated from the difference RB0−RC0 in the frame (n−1), immediately before the present frame.

Figure 20:
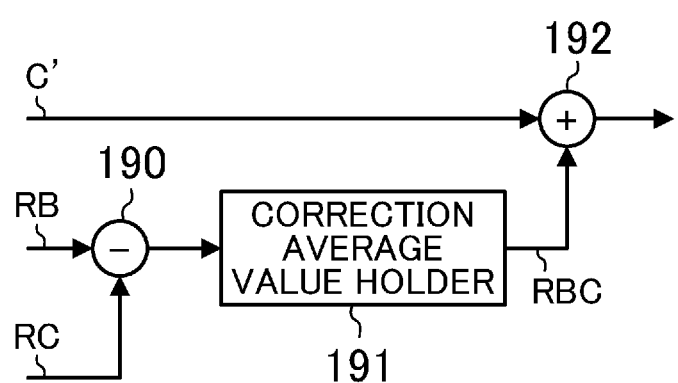
FIG. 20 is a block diagram illustrating an example configuration of a correction average value adder.

FIG. 20 is a block diagram illustrating an example configuration of the correction average value adder 19 in the clamping circuit of FIG. 18. As shown in FIG. 20, the correction average value adder 19 includes a second subtractor 190, a correction average value holder 191, and a fourth adder 192.

The second subtractor 190 subtracts the third reference value RC output from the third reference value calculator 13 from the second reference value RB output from the second reference value calculator 12, and outputs the result. The correction average value holder 191 holds the output of the second subtractor 190 to the next, i.e., the subsequent frame, and outputs the value as a correction average value RBC. Where the difference between the second reference value RB and the third reference value RC changes depending on the drive conditions of the imaging device 10, the calculated correction average value RBC may be multiplied by a corresponding gain or may be subjected to offset adjustment. The fourth adder 192 adds the correction average value RBC to the input fourth average value C', and outputs the result.

Thus, the correction average value RBC is the difference between the third reference value RC and the second reference value RB of the previous frame. As long as the relation does not change, the addition of the fourth average value C' to the correction average value RBC corresponds to the calculation of the pixel signals of the average value in the second reference value calculation region B after the third clamping.

Figure 17:
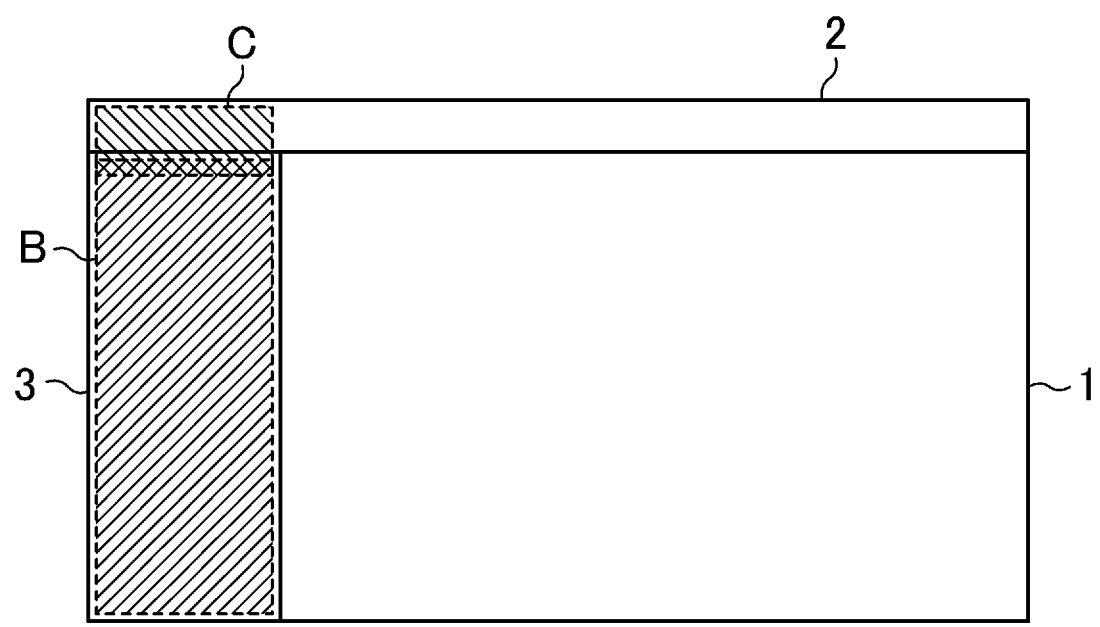
FIG. 17 illustrates shielded pixel regions used for calculating reference values in another variation of the third embodiment.

Another signal processing may be performed between the third clamping and the clamp correction. If any delay occurs, as shown in FIG. 17, the third reference value calculation region (i.e., the shaded portion C) may include the shielded pixels of the second shielded pixel region 3 other than the first shielded pixel region 2 in view of the delay amount. Then, more pixels are used in averaging in the third reference value calculation region C, thereby reducing influence of random noise. If the other signal processing is gain adjustment of the pixel signals of the effective pixel region 1, clamp correction may be performed while performing corresponding gain adjustment of the clamp correction value.

Where the second reference value calculation region (i.e., the shaded portion B) includes the shielded pixels of the first shielded pixel region 2 to use more pixels for generating the average value B(n) in the second reference value calculation region B, thereby reducing influence of random noise etc.

Then, in the frame (n+1) and the subsequent frames, the black signal level of the imaging device 10 is in the steady state. Even without the clamp correction, the second reference value RB1 generated in the shielded pixel region of the frame (n) and the subsequent frames is used. Thus, the black signal level of the effective pixel region 1 after the third clamping is expressed by $$VD+(B1-RB1)=VD.$$

Where the timing of changing the black signal level is clear in advance, for example, when the drive state of the imaging device 10 changes, the clamp correction may be performed at that timing.

Alternatively, the clamp correction value may be monitored, and the clamp correction may be performed upon detecting a change in the black signal level of the imaging device 10 based on a change in the monitored value. Specifically, since the clamp correction value is almost zero in a steady state, where the absolute value of the clamp correction value is great to some extent, the clamp correction may be performed on the assumption that the black signal level of the imaging device 10 has changed.

As described above, in the method of clamping the image signal according to the third embodiment, the stable image signal is output without changing the clamped black signal level of the effective pixel region 1 even when the black signal level of the imaging device 10 changes.

Other Embodiments

As described above, the first to third embodiments have been described as example techniques disclosed in the present application. However, the techniques according to the present disclosure are not limited to these embodiments, but are also applicable to those where modifications, substitutions, additions, and omissions are made. In addition, elements described in the first to third embodiments may be combined to provide a different embodiment.

Elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

The present disclosure has features of reducing variations in the black signal level of an image signal even when the optical black signal level varies with a change in the storage time of an imaging device, etc. The present disclosure is useful for imaging systems such as video cameras shooting movies or performing high sensitive shooting while changing the frame rate.

What is claimed is:

1. A clamping method in outputting an image signal of each of successive frames using an imaging device including an effective pixel region outputting an effective pixel signal obtained by imaging an object, and a first shielded pixel region outputting a shielded pixel signal before the effective pixel signal for a present frame is output and after the effective pixel signal for a previous frame is output, where photoelectric conversion elements are arranged two-dimensionally, the method comprising:

first clamping determining an optical black signal level of the effective pixel signal by subtracting a first reference value RA(n) from the effective pixel signal of a present frame (n), and then adding a first predetermined target value to a result of the subtraction, the value RA(n) being obtained by performing first stabilization of a first average value A(n) calculated by averaging first reference value calculation pixel signals of a first reference value calculation region including shielded pixels of the first shielded pixel region of the present frame (n), wherein the imaging device further includes a second shielded pixel region outputting a shielded pixel signal after the effective pixel signal has been output, in a steady state in which a present frame optical black signal level of the image signal of the present frame (n) does not change, second clamping is performed to determine the optical black signal level of the effective pixel signal by adding a second predetermined target value to the difference between a second reference value RB(n) and an effective pixel signal of a subsequent frame (n+1), the value RB(n) being obtained by performing second stabilization of a second average value B(n) calculated by averaging second reference value calculation pixel signals of a second reference value calculation region including at least shielded pixels of the second shielded pixel region, and in a transition state in which the present frame optical black signal level of the image signal of the present frame (n) changes, the first clamping is performed.

2. The clamping method of claim 1, wherein
the second reference value calculation region also includes the shielded pixels of the first shielded pixel region.

3. The clamping method of claim 1, wherein
the second reference value calculation region includes the first reference value calculation region.

4. The clamping method of claim 1, wherein
the first stabilization and the second stabilization are switchable between an on state and an off state,
in the on state, the first average value A(n) and the second average value B(n) are respectively output as the first reference value RA and the second reference value RB after reducing variations caused by noise contained in the values A(n) and B(n), and
in the off state, the first average value A(n) and the second average value B(n) are respectively output as the first reference value RA(n) and the second reference value RB(n) without change.

5. The clamping method of claim 1, wherein
in the first stabilization and the second stabilization, the first reference value RA(n) and the second reference value RB(n) of the present frame (n) are gradually changed and output.

6. The clamping method of claim 1, wherein
in the first clamping, the first stabilization and the second stabilization are in an off state.

7. The clamping method of claim 1, wherein
switching between the first clamping and the second clamping is performed depending on presence or absence of a change in a drive state of the imaging device, which is accompanied by a change in the present frame optical black signal level.

8. The clamping method of claim 1, wherein
switching between the first clamping and the second clamping is performed upon detecting presence or absence of a change in the optical black signal level of the effective pixel signal based on a change in the first average value A(n) or the first reference value RA(n).

9. The clamping method of claim 1, wherein
in the first clamping, the optical black signal level of the effective pixel signal is determined by adding the first predetermined target value to the difference between a value and the effective pixel signal of the present frame, the value being obtained by adding a predetermined correction reference value RBA to the first reference value RA(n).

10. A clamping method in outputting an image signal of each of successive frames using an imaging device including an effective pixel region outputting an effective pixel signal obtained by imaging an object, and a first shielded pixel region outputting a shielded pixel signal before the effective pixel signal for a present frame is output and after the effective pixel signal for a previous frame is output, where photoelectric conversion elements are arranged two-dimensionally, the method comprising:

first clamping determining an optical black signal level of the effective pixel signal by subtracting a first average value A(n) from the effective pixel signal of a present frame (n), and then adding a first predetermined target value to a result of the subtraction, the first average value A(n) being calculated by averaging first reference value calculation pixel signals of a first reference value calculation region including shielded pixels of the first shielded pixel region of the present frame (n), wherein the imaging device further includes a second shielded pixel region outputting a shielded pixel signal after the effective pixel signal has been output, in a steady state in which a present frame optical black signal level of the image signal of the present frame (n) does not change, second clamping is performed to determine the optical black signal level of the effective pixel signal by adding a second predetermined target value to the difference between a second average value B(n) and an effective pixel signal of a subsequent frame (n+1), the second average value B(n) being calculated by averaging second reference value calculation pixel signals of a second reference value calculation region including at least shielded pixels of the second shielded pixel region, and in a transition state in which the present frame optical black signal level of the image signal of the present frame (n) changes, the first clamping is performed.

\* \* \* \* \*